(12) United States Patent
Sharma et al.

(10) Patent No.: US 11,409,895 B2
(45) Date of Patent: Aug. 9, 2022

(54) AUTOMATIC DISCOVERY OF COMPUTING COMPONENTS WITHIN A HIERARCHY OF ACCOUNTS DEFINING THE SCOPE AND SERVICES OF COMPONENTS WITHIN THE COMPUTING ENVIRONMENT

(71) Applicant: VMWARE, INC., Palo Alto, CA (US)

(72) Inventors: Abhijit Sharma, Pune (IN); Amarjit Gupta, Pune (IN); Somil Bhandari, Pune (IN)

(73) Assignee: VMware, Inc., Palo Alto, CA (US)

( * ) Notice: Subject to any disclaimer, the term of this patent is extended or adjusted under 35 U.S.C. 154(b) by 143 days.

(21) Appl. No.: 16/789,450

(22) Filed: Feb. 13, 2020

(65) Prior Publication Data

US 2021/0182414 A1    Jun. 17, 2021

(30) Foreign Application Priority Data

Dec. 11, 2019    (IN) .............................. 201941051270

(51) Int. Cl.
*H04L 29/06* (2006.01)
*G06F 21/62* (2013.01)
*G06F 21/31* (2013.01)
*G06F 21/57* (2013.01)
*G06F 21/78* (2013.01)
*G06F 21/44* (2013.01)

(52) U.S. Cl.
CPC .......... *G06F 21/6218* (2013.01); *G06F 21/31* (2013.01); *G06F 21/44* (2013.01); *G06F 21/57* (2013.01); *G06F 21/78* (2013.01)

(58) Field of Classification Search
CPC ............................ G06F 21/6218; G06F 21/57
See application file for complete search history.

(56) References Cited

U.S. PATENT DOCUMENTS

| | | | |
|---|---|---|---|
| 10,204,225 B2 * | 2/2019 | Chen ....................... G06F 21/57 |
| 10,437,996 B1 * | 10/2019 | Li ........................... H04L 63/20 |
| 2020/0120138 A1 * | 4/2020 | Sanders ................. G06N 5/003 |
| 2020/0252405 A1 * | 8/2020 | Sankavaram ......... H04L 63/102 |

* cited by examiner

*Primary Examiner* — Jason K Gee

(57) ABSTRACT

A feature selection methodology is disclosed. In a computer-implemented method, components of a computing environment are automatically monitored, and have a feature selection analysis performed thereon. Provided the feature selection analysis determines that features of the components are well defined, a classification of the features is performed. Provided the feature selection analysis determines that features of the components are not well-defined access to those features are discarded. Results of the feature selection methodology are generated.

12 Claims, 7 Drawing Sheets

AUTOMATIC DISCOVERY OF COMPUTING COMPONENTS WITHIN A HIERARCHY OF ACCOUNTS DEFINING THE SCOPE AND SERVICES OF COMPONENTS WITHIN THE COMPUTING ENVIRONMENT

RELATED APPLICATIONS

Benefit is claimed under 35 USC. 119(a) (d) to Foreign Application Serial No. 201941051270 filed in India entitled "AUTOMATIC DISCOVERY OF COMPUTING COMPONENTS WITHIN A HIERARCHY OF ACCOUNTS DEFINING THE SCOPE AND SERVICES OF COMPONENTS WITHIN THE COMPUTING ENVIRONMENT" on Dec. 11, 2019, by VMWARE, Inc., which is herein incorporated in its entirety by reference for all purposes.

BACKGROUND ART

Cloud computing is now becoming pervasive. When operating according to a cloud computing model, a corporation would rely on an interconnected group of remote severs, on the Internet for all or most of its data storage and processing needs. The cloud infrastructure, that is, the group of physical servers that hosts the storage and processing capabilities of the cloud and the associated networking, configuration and software, may be physically located in one or more datacenters that may be geographically distributed, Cloud infrastructure may be termed "private" or "public" with the former referring to cloud infrastructure that are dedicated to a single user or corporation (or a closed group of corporations) and the latter referring to cloud infrastructures that are open to any users or corporations e.g., Amazon Web Service (AWS) by Amazon is an example of a currently available public cloud infrastructure. A cloud infrastructure may also be referred to as simply as a "Cloud".

With the data of many users and/or corporations being hosted on shared cloud infrastructure, public clouds in particular, must exercise strict access practices to access data and services. In a typical cloud deployment, users associated with a corporation access that corporation's applications/services through a web-based interface to servers that are hosted in the cloud. In this example the interactions among processing applications and between applications and data storages occur within the cloud. In another example, is where an application or applications part executing on a computer outside of the cloud requires access to some resources or applications that are in the cloud. For example, a software developer for a corporation may want to develop code for, and test, a portion of an application that requires communication with other applications and/or data hosted for that corporation on a cloud, and for convenience, may want to execute the portion of the application on his/her laptop that is outside the cloud.

The second example use case may require that the application portion executing on the developer's laptop has access to all cloud resources of the corporation. Whereas in the first example use case, username and password credentials for each user in the corporation may be sufficient to grant access to the user while protecting the corporation's cloud resources and other users of the cloud. These use scenarios therefore require the user to maintain multiple accounts.

Large organizations have thousands of AWS accounts which are ephemeral in nature, as accounts need to be commissioned/decommissioned as employees join/leave the organization. In order to effectively manage or gain visibility into the resources consumed at every account, administrators need to get a way to access the accounts while keeping access and security intact.

Monitoring and planning tools generally require fetching all the resources/services in the accounts. These tools query accounts individually to fetch these resources. Configuring/deleting large number of accounts on a regular basis is tedious and time consuming, as well as error prone. Missing out on an account can cause Planning error, missed alerts, incorrect cost estimation, etc.

In the conventional systems Identity and Access Management provides the capability for managing accounts and users. Using trust relationships between accounts, it is possible to form complex access hierarchies, where access to individual account is controlled centrally using a particular control account as shown in FIG. 1A. Account hierarchies are frequently used in large organizations for consolidating bills and centralized control of linked accounts 114-119. Accounts hierarchies are helpful for monitoring, auditing and billing purposes. However, in large organizations, account hierarchies can quickly grow complex with 1000s of linked accounts 114-119 and multiple control accounts 111-113. Monitoring these accounts may require configuring all hierarchies and access keys individually for all accounts 110-119, which can be a repetitive and error prone process given the plethora of monitoring and diagnostics tools conventionally available.

To mitigate some of the shortfalls of the conventional account configuration methodology, conventional tools utilize a assume Role capability as illustrated in FIG. 16. In these methods, the Assume Role capability enables aa control account 122-124 to obtain a temporary credential for the linked accounts 130-135 which it trusts. However, control accounts 122-124 can only assume the role once it is aware of the Role ARN for the specific link account 130-135. There is no way to understand which all linked accounts trust which control account. In the example illustrated in FIG. 1B, organizational units (OUs) 140-160 are setup to enable accounts to be grouped and to be administered as a single unit. These organizational units 140-160 can be created at the master account level 121 wherein all the underlying accounts 122-135 can be regrouped into different organizations. It enables the administrator to simplify the management of the various accounts. In itself, the OUs 140-160 only provide a logical grouping and thus the deeper management/discovery of individual accounts will still be lacking.

In such conventional approaches, the level of protection for the computing environment is highly dependent upon the knowledge or experience of the IT administrator. For example, an IT administrator may incorrectly choose to not register various machines or components for protection by the security system. Moreover, as the complexity of the computing environment increases and the number of machines or components therein increases, it is highly likely that the IT administrator may unintentionally "miss" or "forget" to register certain machines or components for protection by the security system. Further, in a machine learning environment, the IT administrator may simply not be aware of the importance of particular machines or components to the machine learning environment, and, therefore, the IT administrator will fail to list those machines or components for protection by the security system. As a result, it is possible that even important and/or extremely relevant features of a machine learning environment may not be properly registered for appropriate protection by the account discovery system.

It should also be noted that most computing environments, including machine learning environments are not static. That is, various machines or components are constantly being added to, or removed from, the computer environment. As such changes are made to the computing environment, it is frequently necessary to amend or change which of the various machines or components (virtual and/or physical) are registered with the security system. Hence, in conventional approaches, and IT administrator (or similar) is required to at least periodically reassess which machines or components the IT administrator needs to register for protection with the account discovery system and the myriad of accounts associated with the resources and components within such computing environment.

Hence, it is possible that newly added important and/or extremely relevant features of a machine learning environment are not be properly registered for appropriate protection by the security system. It is also possible that machines or components which once warranted protection by the security system, no longer require such security protection.

Thus, conventional approaches for providing access to machines or components of a computing environment, including a machine learning environment, are highly dependent upon the skill and knowledge of a system administrator. Also, conventional approaches for providing access to machines or components of a computing environment, are not acceptable in complex and frequently revised computing environments.

In conventional approaches to discovery and monitoring of services and applications in a computing environment, constant and difficult upgrading of agents is often required. Thus, conventional approaches for application and service discovery and monitoring are not acceptable in complex and frequently revised computing environments.

Additionally, many conventional computing systems require every machine or component within a computing environment be assigned to a particular scope and service group so that the intended states can be derived from the service type. As the size and complexity of computing environments increases, such a requirement may require a high-level system administrator to manually register as many as thousands (or many more) of the machines or components (such as, for example, virtual machines) with the security system, Thus, such conventionally mandated registration of the machines or components is not a trivial job. This burden of manual registration is made even more burdensome considering that the target users of many security systems are often experienced or very high-level personnel such as, for example, Chief Information Security Officers (CISOs) and their teams who already have heavy demands on their time.

BRIEF DESCRIPTION OF THE DRAWINGS

The accompanying drawings, which are incorporated in and form a part of this specification, illustrate embodiments of the present technology and, together with the description, serve to explain the principles of the present technology.

Figure 1A:
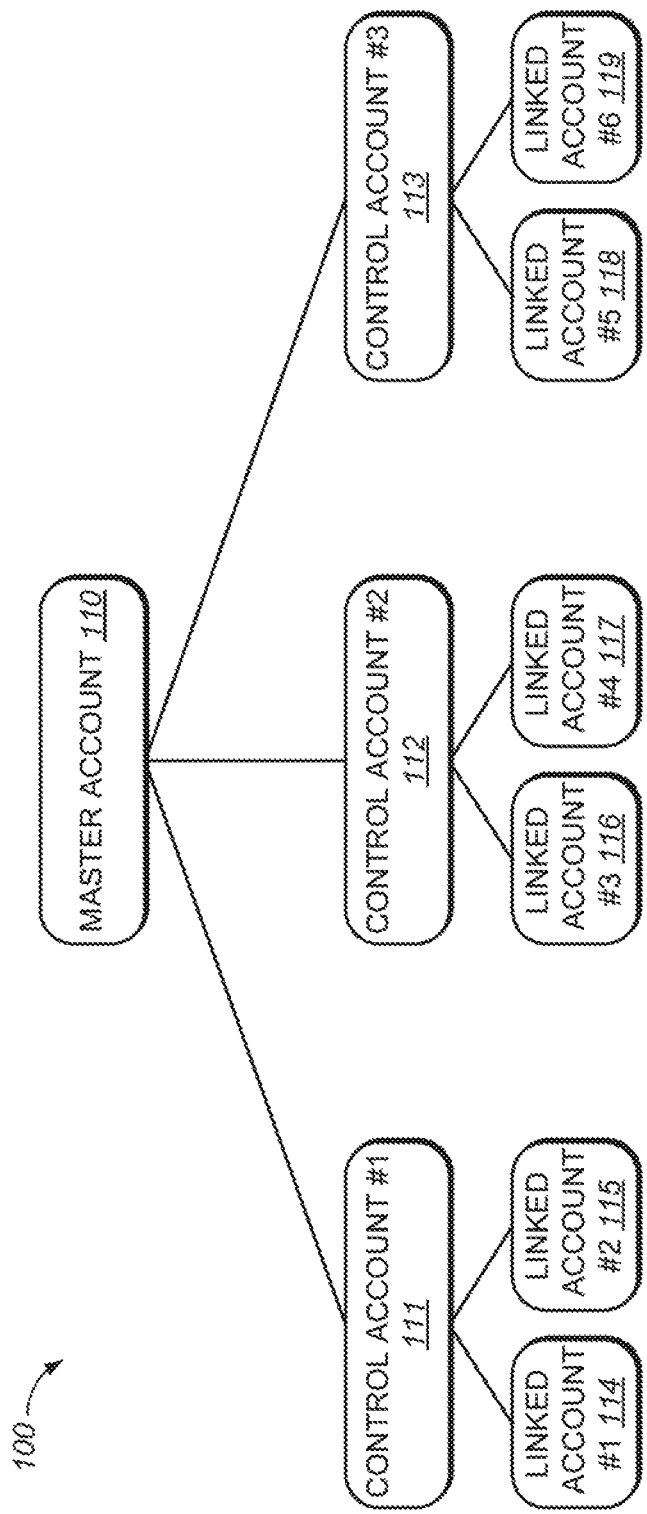
FIG. 1A is an exemplary conventional account discovery topology.
Figure 1B:
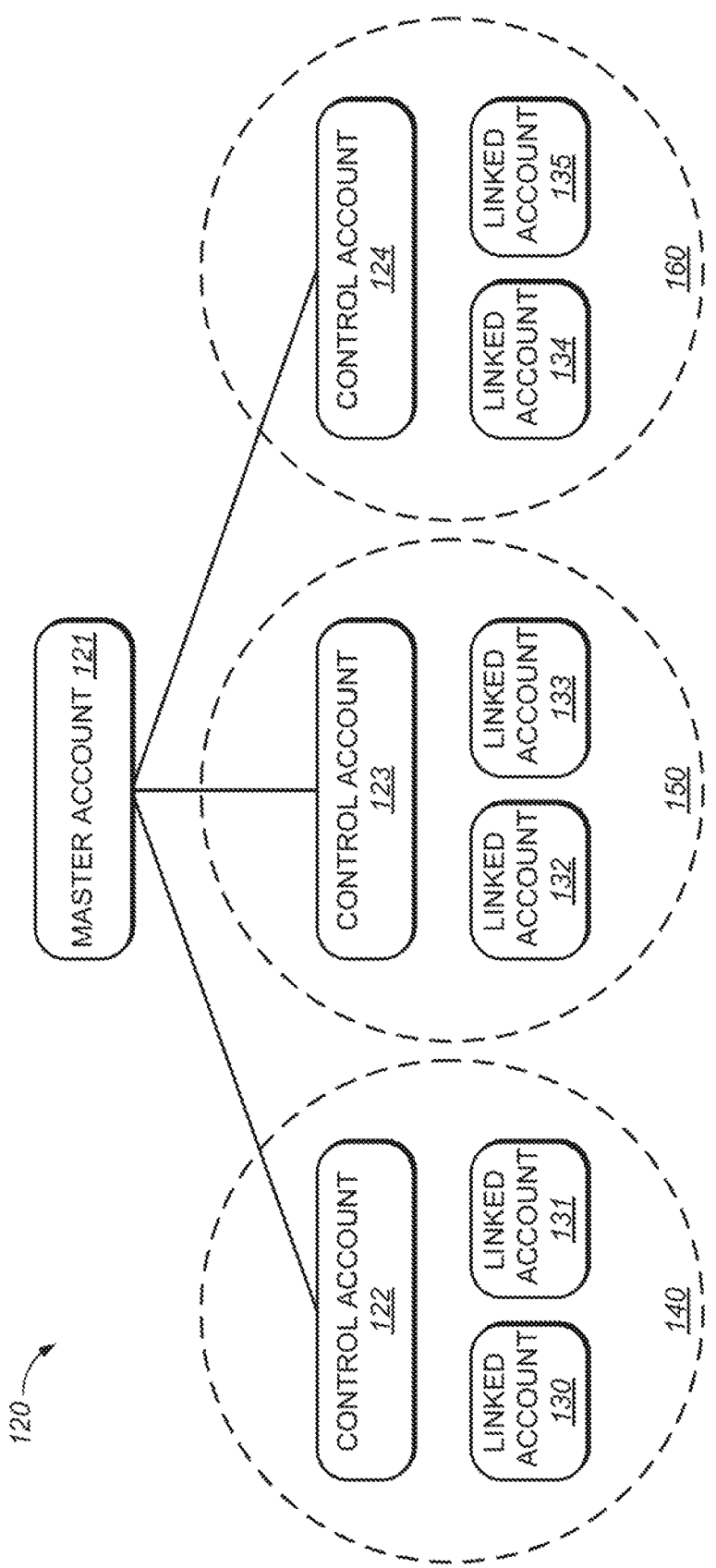
FIG. 1B is a conventional account grouping within organization in computing environment.

The drawings referred to in this description should not be understood as being drawn to scale except if specifically noted.

DETAILED DESCRIPTION OF EMBODIMENTS

Reference will ow be made in detail to various embodiments of the present technology, examples of which are illustrated in the accompanying drawings. While the present technology will be described in conjunction with these embodiments, it will be understood that they are not intended to limit the present technology to these embodiments. On the contrary, the present technology is intended to cover alternatives, modifications and equivalents, which may be included within the spirit and scope of the present technology as defined by the appended claims. Furthermore, in the following description of the present technology, numerous specific details are set forth in order to provide a thorough understanding of the present technology. In other instances, well-known methods, procedures, components, and circuits have not been described in detail as not to unnecessarily obscure aspects of the present, technology.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "displaying", "identifying", "generating", "deriving", "providing," "utilizing", "determining," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. The electronic device manipulates and transforms data, represented as physical (electronic and/or magnetic) quantities within the electronic device's registers and memories, into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules executed by one or more computers or other devices. Generally, program modules include routines, programs objects, components, data structures, etc., that perform particular tasks or implement particular abstract data types. The functionality of the program modules may be combined or distributed as desired in various embodiments.

In the Figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system, Skilled artisans may implement the described functionality in varying ways for each particular application, but such implementation decisions should not be interpreted as causing a departure from the scope of the present disclosure. Also, the example mobile electronic device described herein may include components other than those shown, including well-known component.

The techniques described herein may be implemented in hardware, software, firmware, or any combination thereof, unless specifically described as being implemented in a specific manner, Any features described as modules or components may also be implemented together in an integrated logic, device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some embodiments, the functionality described herein may be provided within dedicated software modules or hardware modules configured as described herein. Also, the techniques could be fully implemented in one or more circuits or logic elements. A general-purpose processor be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Example Computer System Environment

Figure 2:
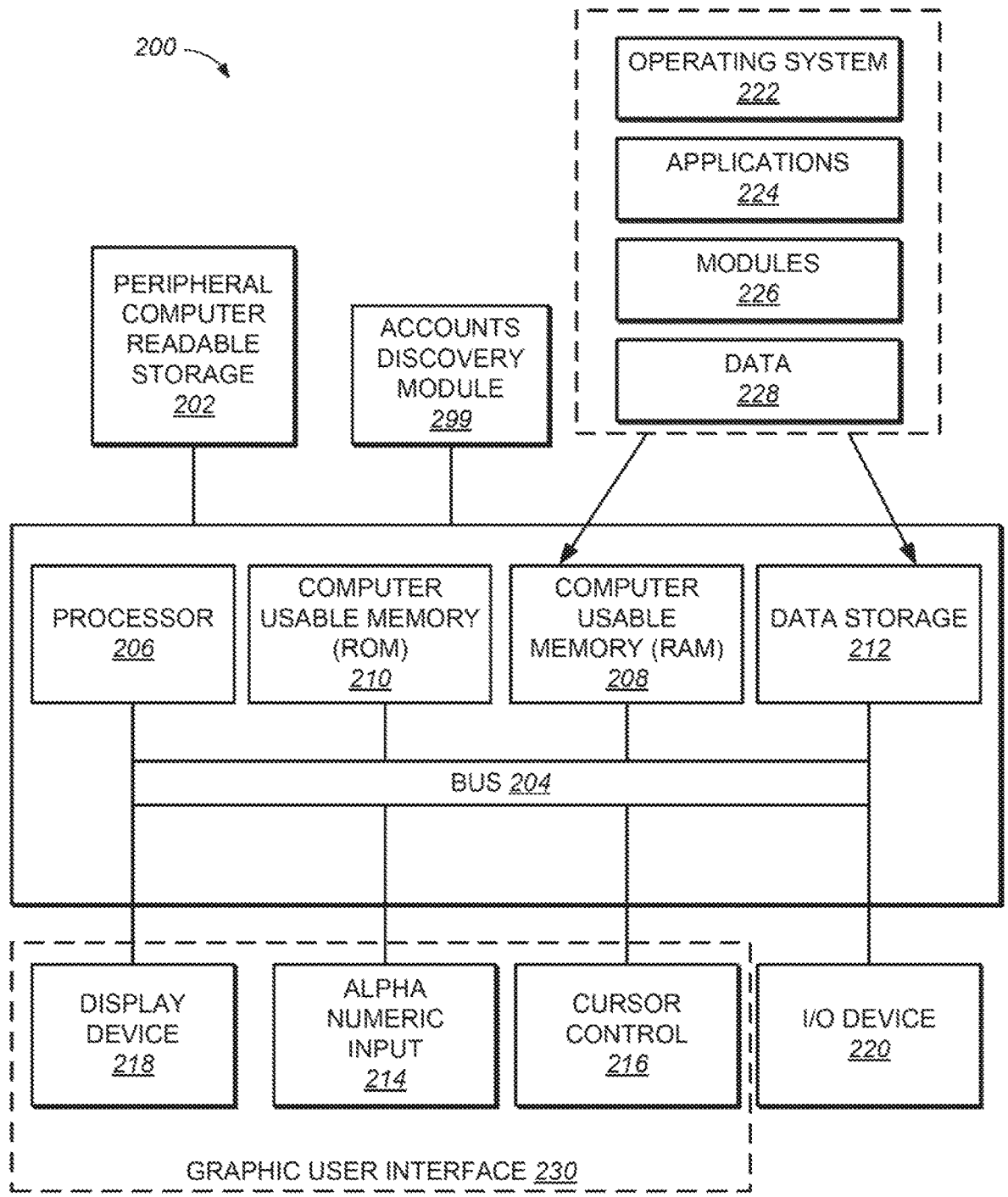
FIG. 2 shows an example computer system upon which embodiments of the present invention can be implemented in accordance with an embodiment of the present invention.

With reference now to FIG. 2, all or portions of some embodiments described herein are composed of computer-readable and computer-executable instructions that reside, for example, in computer-usable/computer-readable storage media of a computer system. That is, FIG. 2 illustrates one example of a type of computer (computer system 200 that can be used in accordance with or to implement various embodiments which are discussed herein. It is appreciated that computer system 200 of FIG. 2 is only an example and that embodiments as described herein can operate on or within a number of different computer systems including, but not limited to, general purpose networked computer systems, embedded computer systems, routers, switches, server devices, client devices, various intermediate devices/nodes, standalone computer systems, media centers, handheld computer systems, multi-media devices, virtual machines, virtualization management servers, and the like. Computer system 200 of FIG. 2 is well adapted to having peripheral tangible computer-readable storage media 202 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 200 of FIG. 2 includes an address/data bus 204 for communicating information, and a processor 206A coupled with bus 204 for processing information and instructions. As depicted in FIG. 2, system 210 is also well suited to a multi-processor environment in which a plurality of processors 206A, 206B, and 206C are present. Conversely, system 200 is also well suited to having a single processor such as, for example, processor 206A. Processors 206A, 206B, and 206C may be any of various types of microprocessors. System 200 also includes data storage features such as a computer usable volatile memory 108, e.g., random access memory (RAM), coupled with bus 204 for storing information and instructions for processors 206A, 206B, and 206C, System 200 also includes, computer usable non-volatile memory 210, e.g., read only memory (ROM), coupled with bus 204 for storing static information and instructions for processors 206A, 2066, and 206C. Also present in system 200 is a data storage unit 212 (e.g, a magnetic or, optical disc and disc drive) coupled with bus 204 for storing information and, instructions. System 200 also includes an alphanumeric input device 214 including alphanumeric and function keys coupled with bus 204 for communicating information and command selections to processor 206A or processors 206A, 206B, and 206C. System 200 also includes a cursor control device 216 coupled with bus 204 for communicating user input information and command selections to processor 206A or processors 206A, 206B, and 206C. In one embodiment, system 200 also includes a display device 218 coupled with bus 204 for displaying information.

Referring still to FIG. 2, display device 218 of FIG. 2 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 216 allows the computer user to dynamically signal the movement of a visible symbol (cursor) on display screen of display device 218 and indicate user selections of selectable items displayed on display device 218, Many implementations of cursor control device 216 are known in the art, including a trackball, mouse, touch pad, touch screen, joystick or special keys on alphanumeric input device 214 capable of signaling movement of a given direction or manner of displacement. Alternatively, it will be appreciated that a cursor can be directed and/or activated via input from alphanumeric input device 214 using special keys and key sequence commands. System 200 is also well suited to having a cursor directed by other means such as, for example, voice commands. In various embodiments, alpha-numeric input device 214, cursor control device 216, and display device 218, or any combination thereof (e.g., user interface selection devices), may collectively operate to provide a graphical user interface (GUI) 230 under the direction of a processor (e.g., processor 206A or processors 206A, 206B, and 206C), GUI 210 allows user to interact with system 200 through graphical representations presented on display device 218 by interacting with alpha-numeric input device 214 and/or cursor control device 216.

System 200 also includes an I/O device 220 for coupling system 200 with external entities. For example, in one embodiment, I/O device 220 is a modem for enabling wired or wireless communications between system 200 and an external network such as, but not limited to, the Internet.

Referring still to FIG. 2, various other components are depicted for system 100. Specifically, when present, an operating system 222 applications 224, modules 226, and data 228 are shown as typically residing in one or some combination of computer usable volatile memory 208 (e.g., RAM), computer usable non-volatile memory 210 (e.g., ROM), and data storage unit 212. In some embodiments, all or portions of various embodiments described herein are stored, for example, as an application 224 and/or module 228 in memory locations within RAM 208, computer-readable storage media within data storage unit 212, peripheral computer-readable storage media 202, and/or other tangible computer-readable storage media.

Brief Overview

First, a brief overview of an embodiment of the present continuous automatic discovery of services within linked accounts invention (ADS) 299, is provided below. Various embodiments of the present invention provide a method and system for automated feature selection within a virtual computing environment.

More specifically, the various embodiments of the present invention provide a novel approach for automatically providing continuous monitoring of multiple service accounts within organizational units spanning applications in the virtual computing environment to discovery linked accounts in a networking platform such as, for example, the Amazon web service (AWS) environment. In one embodiment, an IT administrator (or other entity such as, but not limited to, a user/company/organization etc) configures the computing environment to enable auto-discovery of all AWS accounts in a corporate environment and workload/services in the accounts. In one embodiment, the administrator configures a one-time high-level account. The high-level account is combined with the Trusted accounts capability with an organizational API capability to obtain a temporary credential to discover the resources and services associated with high-level master accounts. In the present embodiment, the IT administrator is not required to label all of the virtual machines with the corresponding service type or indicate the importance of the particular machine or component. Further, the IT administrator is not required to selectively list only those machines or components which the IT administrator feels warrant account maintenance in the computing environment. Instead, and as will be described below in detail, n various embodiments, the present invention, will automatically determine accounts specified for a particular organizational unit by providing a master account credential, a control account credential and the respective link accounts in a hierarchical structure to enhance accessibility to the computer resources and components within the computing environment.

As will also be described below, in various embodiments, the present invention is a computing module which integrated within a virtual computing system such as, for example, the virtual computing devices from VMware, Inc. of Palo Alto. In various embodiments, the present ADS 299 invention, will itself figure out the service type and corresponding importance of various machines or components after observing the activity by each of the machines or components for continuously or periodically.

Importantly, for purposes and brevity and clarity, the following detailed description of the various embodiments of the present invention, will be described using an example in which the embodiments of the present ADS 299 invention are integrated into a virtual computing system, such as, but not limited to, virtual computer systems from VMware, Inc. of Palo Alto, Calif. Importantly, although the description and examples herein refer to embodiments of the present invention applied to the above account discovery system with, for example, its corresponding set of functions, it should be understood that the embodiments of the present invention are well suited to use with various other types of computer systems.

Additionally, for purposes of brevity and clarity, the present application will refer to "machines or components" of a computing environment. It should be noted that for purposes of the present application, the terms "machines or components" is intended to encompass physical (e.g., hardware and software based) computing machines, physical components (such as, for example, physical modules or portions of physical computing machines) which comprise such physical computing machines, aggregations or combination of various physical computing machines, aggregations or combinations or various physical components and the like. Further, it should be noted that for purposes of the present application, the terms "machines or components" is also intended to encompass virtualized (e.g., virtual and software based) computing machines, virtual components (such as, for example, virtual modules or portions of virtual computing machines) which comprise such virtual computing machines, aggregations or combination of various virtual computing machines, aggregations or combinations or various virtual components and the like.

Additionally for purposes of brevity and clarity, the present application will refer to machines or components of a computing environment. It should be noted that for purposes of the present application, the term "computing environment" is intended to encompass any computing environment (e.g., a plurality of coupled computing machines or components including, but not limited to, a networked plurality of computing devices, a neural network, a machine learning environment, and the like), Further, in the present application the computing environment may be comprised of only physical computing machines, only virtualized computing machines, or, more likely, some combination of physical and virtualized computing machines.

Furthermore, again for purposes and brevity and clarity, the following description of the various embodiments of the present invention, will be described as integrated within a virtual computing system. Importantly, although the description and examples herein refer to embodiments of the present invention integrated within a virtual computing system with, for example, its corresponding set of functions, it should be understood that the embodiments of the present invention are well suited to not being integrated into a virtual computing system and operating separately from a virtual computing system. Specifically, embodiments of the present invention can be integrated into a system other than a virtual computing system Embodiments of the present invention can operate as a stand-alone module without requiring integration into another system. In such an embodiment, results from the present invention regarding feature selection and/or the importance of various machines or components of a computing environment can then be provided as desired to a separate system or to an end user such as, for example, an IT administrator.

Importantly, the embodiments of the present ADS invention significantly extend what was previously possible with respect to providing security for machines or components of a computing environment. Various embodiments of the present ADS invention enable the improved capabilities while reducing reliance upon, for example, an IT administrator, to selectively register various machines or components of a computing environment for security protection and monitoring. This is in contrast to conventional approaches for providing manual configuration of access accounts to various machines or components of a computing environment which highly dependent upon the skill and knowledge of a system administrator. Thus, embodiments of present ADS 299 invention provide a methodology which extends well beyond what was previously known.

Also, although certain components are depicted in, for example, embodiments of the ADS 299 invention, it should be understood that, for purposes of clarity and brevity, each of the components may themselves be, comprised of numerous modules or macros which are not, shown.

Procedures of the present ADS 299 invention are performed in conjunction with various computer software and/or hardware components. It is appreciated that in some embodiments, the procedures may be performed in a different order than described above, and that some of the described procedures may not be performed, and/or that one or more additional procedures to those described may be performed. Further some procedures, in various embodiments, are carried out by one or more processors under the control of computer-readable and computer-executable instructions that are stored on non-transitory computer-readable storage media. It is further appreciated that one or more procedures of the present may be implemented in hardware, or a combination of hardware with firmware and/or software.

Hence, the embodiments of the present ADS 299 invention greatly extend beyond conventional methods for providing security to machines or components of a computing environment. Moreover, embodiments of the present invention amount to significantly more than merely using a computer to provide conventional security measures to machines or components of a computing environment, Instead, embodiments of the present invention specifically recite a novel process, necessarily rooted in computer technology, for automatically discovery accounts with the corresponding services and resources within organizations in a computing environment.

Furthermore, in various embodiments of the present invention, and as will be described in detail below, a virtual computing system, such as, but not limit virtual computing systems from VMware, Inc. of Palo Alto. Calif. will include novel accounts discovery solution for a computing environment (including, but not limited to a data center comprising a virtual environment), In embodiments of the present invention, unlike conventional accounts, discovery systems which "chases the threats", the present accounts discovery system will, instead focus on monitoring the intended states of accounts, applications, machines or components of the computing environment, and the present accounts discovery system will raise alarms if any anomaly behavior is detected.

Additionally as will be described in detail below, embodiments of the present invention provide an accounts configuration implementation including a novel search feature for machines or components (including, but not limited to, virtual machines) of the computing environment. The novel search feature of the present accounts discovery system enables ends users to readily assign the proper and scopes and services the machines or components of the computing environment. Moreover, the novel search feature of the present accounts discovery system enables end users to identify various machines or components (including, but not limited to, virtual machines) similar to given and/or previously identified machines or components (including, but not limited to, virtual machines) when such machines or component satisfy a particular given criteria. Hence, as will be described in detail below, in embodiments of the present accounts discovery system, the novel search feature functions by finding or identifying the "siblings" of various other machines or components (including, but not limited to, virtual machines) within the computing environment.

Continued Detailed Description of Embodiments after Brief Overview

As stated above, feature selection which is also known as "variable selection", "attribute selection" and the like, is an import process of machine learning. The process of feature selection helps to determine which features are most relevant or important to use to create a machine learning model (predictive model).

In embodiments of the present invention, an accounts discovery system will utilize a hierarchical account discovery to automatically perform the feature selection process. That is, as will be described in detail below, in embodiments of the present account discovery invention, a computing module, such as, for example, ADS module 299 of FIG. 2, is coupled with a computing environment. Additionally, it should be understood that in embodiments of the present account discovery invention module 299 of FIG. 2 may be integrated with one or more of the various components of FIG. 2. ADS module 299 then automatically evaluates the various accounts and associated machines or components of the computing environment to determine access to various features within the computing environment.

Several selection methodologies are currently utilized in the art of feature selection. The common selection algorithms include three classes: Filter Methods, Wrapper Methods and Embedded Methods. In Filter Methods scores are assigned to each feature based on a statistical measurement. The features are then ranked by their scores and are either selected to be kept as relevant features or they are deemed to not be relevant features and are removed from or not included in dataset of those features defined as relevant features. One of the most popular algorithms of the Filter Methods classification is the Chi Squared Test. Algorithms in the Wrapper Methods classification consider the selection of a set of features as a search result from the best combinations. One such example from the Wrapper Methods classification is called the "recursive feature elimination" algorithm. Finally, algorithms in the Embedded Methods classification learn features while the machine learning model is being created, instead of prior to the building of the model. Examples of Embedded Method algorithms include the "LASSO" algorithm and the "Elastic Net" algorithm.

Figure 3:
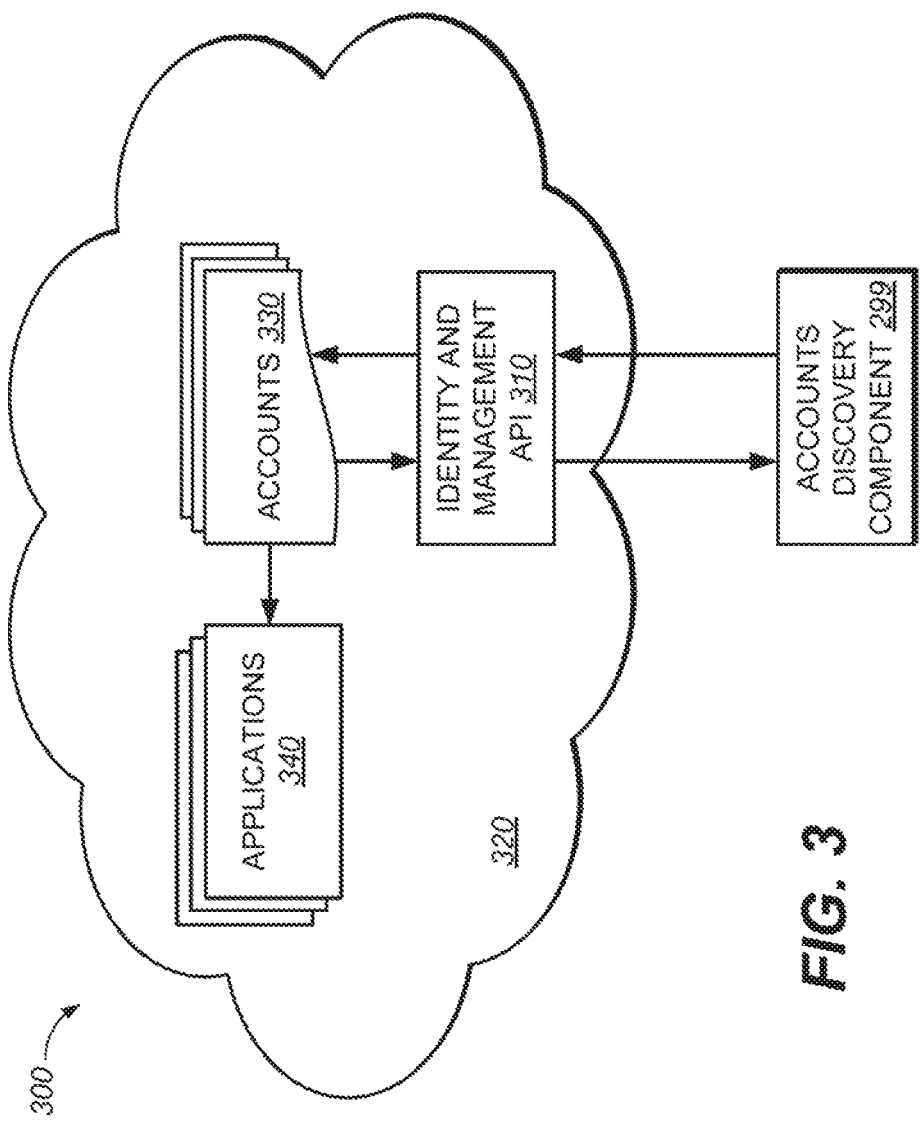
FIG. 3 shows an exemplary computing environment in which one embodiment of the account discovery system can be implemented, in accordance with an embodiment of the present invention.

With reference now to FIG. 3, intone embodiment of the present automatic hierarchical account discovery invention, the automatically derived feature selection results (as described in FIG. 2) are then used by a accounts discovery system to determine the appropriate access level and monitoring for the various machines or components corresponding to the features of the computing environment. In one embodiment, for example, where the present ADS module 299 determined that a feature is highly ranked (e.g very important/very relevant) the access system will then automatically (without requiring the intervention of an IT administrator) assign the appropriate master account associated with the machines or components corresponding to the highly ranked feature.

Referring Still to FIG. 3, an exemplary block diagram for discovering and evaluating accounts system in a virtual networked environment to automatically determine the importance of the various features within the computing environment in accordance with an embodiment of the present invention.

System 300 can include network environment 320 and account discovery component 299. Network environment 320 can be configured to host accounts 330 and applications/services 340. System 300 can be configured by the account discovery component 200 to iteratively determine account and access privileges consistent with disclosed embodiments of the present invention. Based on this determination, system 300 can be automatically configured to provide account information spanning the network 320. In some aspect, system 300 can be configured to take remedial action if access to an account is deemed to have been breached. In one embodiment, system 300 is configured to automatically discover accounts and related linked accounts without any user/administrator intervention following configuration. The particular component arrangement of system 300 depicted in FIG. 3 is not intended to be limiting and can include additional components or fewer components. For example, system 300 can include directory servers, security servers, authentication servers, routers hypervisors or other computing devices.

Network environment 320 can include a cloud computing platform, consistent with disclosed embodiment. Examples of such cloud-computing platforms may include AMAZON WEB SERVICES (AWS) MICROSOFT AZURE, GOGGLE CLOUD and similar systems. In one embodiment, Network 320 is configured to handle a hierarchical list of accounts for the applications/services 340 serviced on Network 320. For example, Network 320 can use AWS INDENTITY AND ACCESS MANAGEMENT (IAM) to define accounts and their associated access permissions for the applications/services 340 deployed in network 320.

Network 320 can be configured to maintain a master account list consistent with disclosed embodiments of the present invention. These master accounts may represent different organizations utilizing the applications/services. The master account list controls the access accounts to applications and services specific to the particular organization. This affords the system 300 to determine access permissions to the applications/service 340 based on an account belonging to that organization.

In one embodiment, the account discovery component 299 is automatically configured to automatically discover accounts 330 with corresponding applications/service 340. In one embodiment, account discovery component 299 can be implemented using one or more computing devices different from those implementing network 320.

In one embodiment, account discovery component 299 communicates with network 320 via identity and management interface (IDM-API) 310. The IDM-API 310 can be exposed by network 320. For example, the scan of network 320 can be based on a query to an application programming interface associated with a cloud network provider. In some embodiments, the account discovery component 299 can be configured to communicate with network 320 over a network. This network can include one or more wired and/or wireless networks.

Account discovery component 299 can be configured to operate automatically or in response to a user command or system command (e.g., a command issued by an application, an instance of an application, an API, a system call, etc.). For example, account discovery component 299 can be scheduled to automatically discover accounts and iterations of it repeatedly, incautiously or periodically. In another embodiment, account detection component can be configured to discover accounts and any to them in real-time.

Applications 340, in one embodiment is deployed across the network 320. In one embodiment, accounts 330 are group responsive to the applications/services 340 that accounts 330 have access to. In another embodiment accounts 330 may be grouped based on the organizations utilizing specific applications/service 340 on network 320 while restricting access to organization outside the designated organization.

Once again, although various embodiments of the present account discovery invention described herein refer to embodiments of the present invention integrated within a security system with, for example, its corresponding set of functions, it should be understood that the embodiments of the present invention are well suited to not being integrated into a security system and operating separately from a security system. Specifically, embodiments of the present invention can be integrated into a system other than a security system. Embodiments of the present invention can operate as a stand-alone module without requiring integration into another system. In such an embodiment, results from the present invention regarding feature selection and/or the importance of various machines or components of a computing environment can then be provided as desired to a separate system onto an end user such as, for example, an IT administrator.

Figure 4:
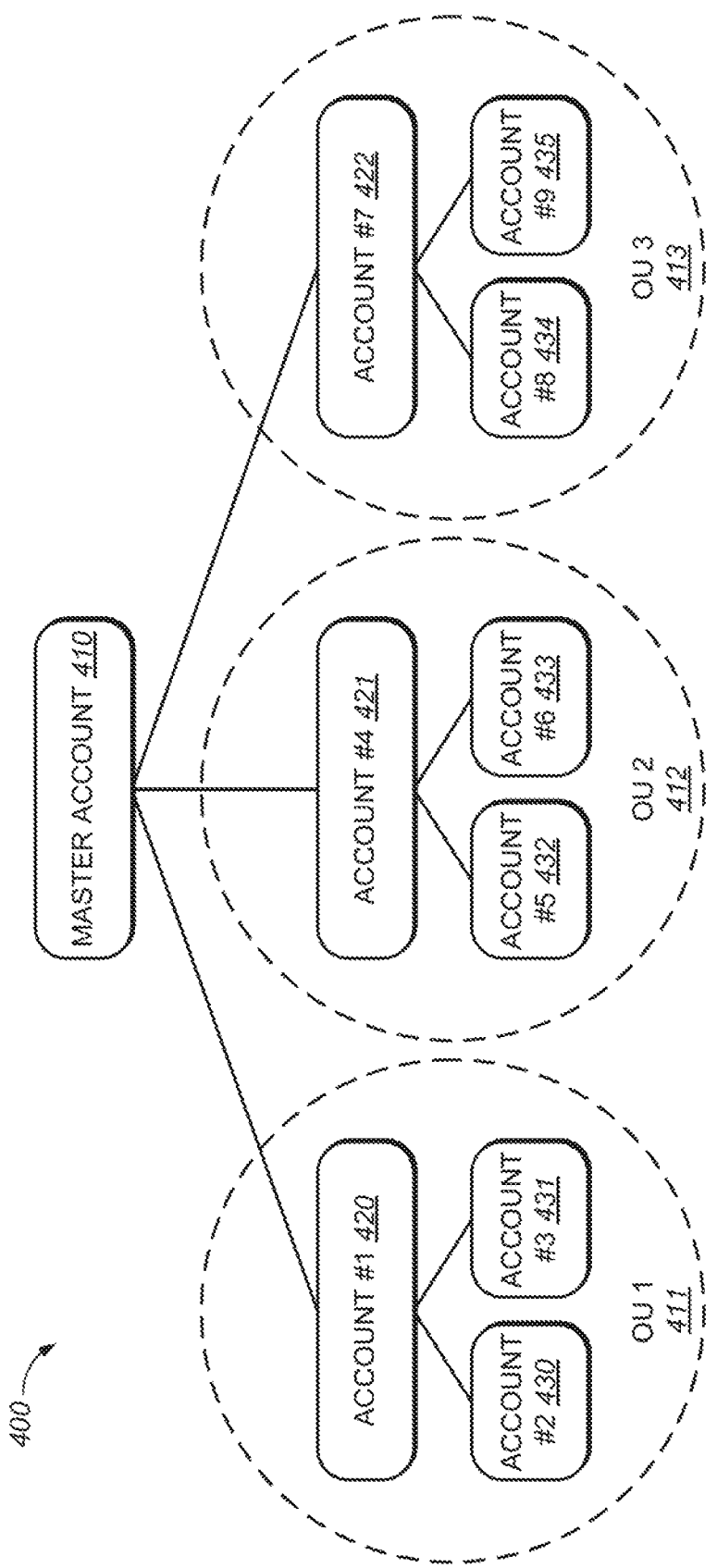
FIG. 4 is an exemplary account topology generated by the ADS, in accordance with an embodiment of the present invention.

With reference now to FIG. 4, a topological diagram 400 of the hierarchical accounts structure generated by the continuous automatic discovery component in accordance with one embodiment of the present invention is shown. As shown in FIG. 4, master account 410 is configured once at a high-level. In one embodiment, the accounts structure is grouped based on organizational units (OU 411-413), In one embodiment, the OUs 411-413 can be recursively be placed. The OUs 411-413 are allocated a single Role name. The Role name is used to pair the control accounts 420-422 with the linked accounts 430-435.

This way, the control accounts 420-422 each assumes role over their respective link accounts. In one embodiment, the control accounts 420-422 use the resource identifier (e.g., ARN) to assume role over the linked accounts 430-435. Prior to assuming role over the linked accounts, the control accounts must have trusted credentials between it and the associated linked accounts. With the account structure hierarchically constructed in FIG. 4, a user only needs to provide the master account credentials, role name and control accounts credentials in order to access the linked accounts and any corresponding resources or components workloads in the computing environment. Similarly, if new accounts are added to the hierarchy, the accounts will automatically be discovered t out having to provide any extra information or credentials.

Figure 5:
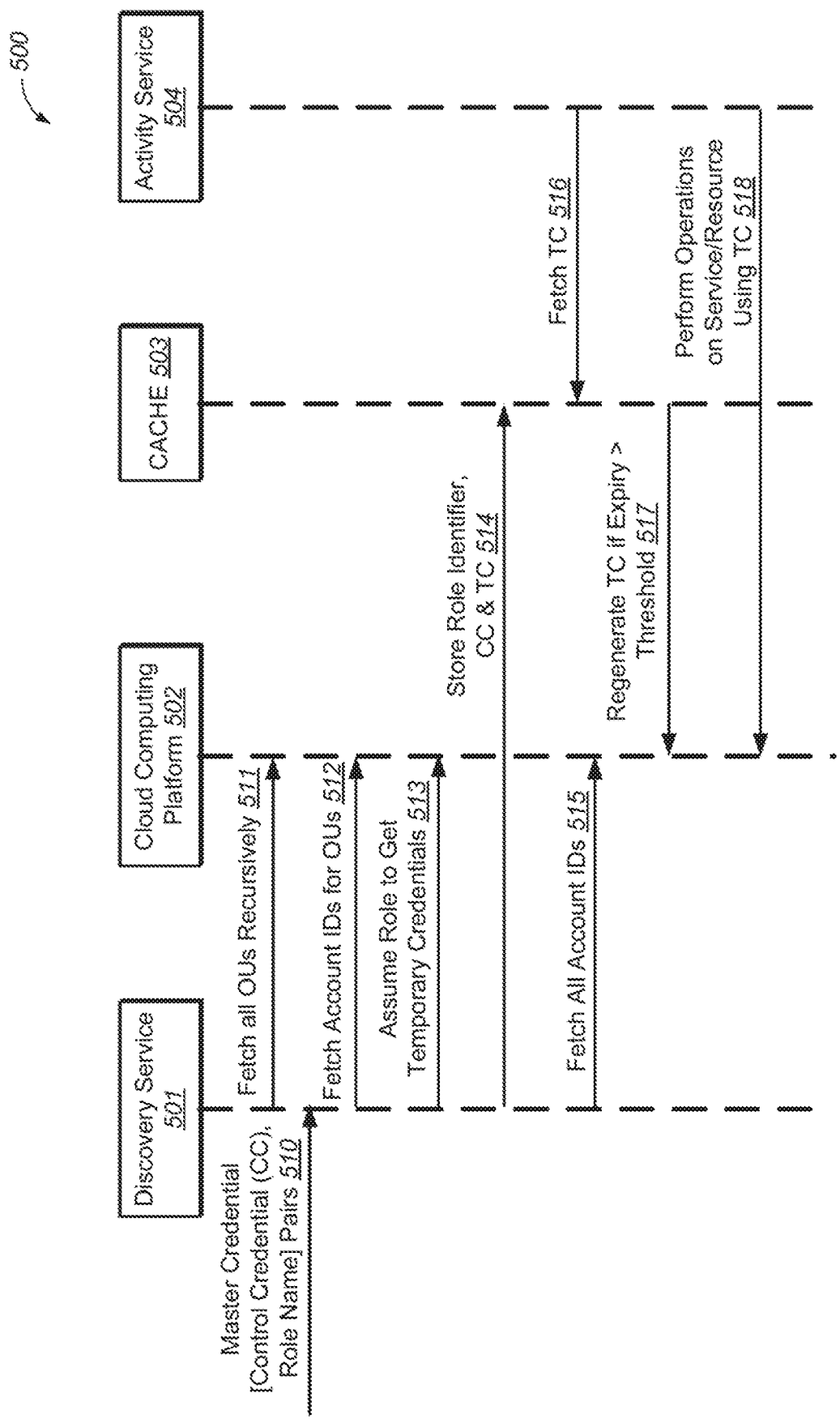
FIG. 5 is a flow diagram showing processes in the ADS for automatically discovering accounts hierarchy in virtual computing environment, in accordance with an embodiment of the present invention.

With reference now to FIG. 5 a flowchart 500 illustrating, the workflow of one embodiment of the present account discovery system is provided. As depicted in FIG. 5, in one embodiment, the present account discovery system may operate in one or more devices in the network environment. Although flow chart 500 illustrates operations 510-518 in a particular order, in one embodiment operations 510-518 may be performed in an order different from that shown or may be performed with one or more additional operations or without one or more operations 510-518.

The operations illustrated in FIG. 5, illustrates communications between the auto-discovery component, Cloud Computing platform 502. Cache 503 and activity service 504. Cloud Computing platform 502 represents the cloud infrastructure, A user communication over the cloud may interact with the discovery service 501 to provide and automatically discover and retrieve accounts associated with services in activity service 504.

Still referring to FIG. 5, the account discovery activity commences 610 with the user providing the pairing of roaster account credential and control account credential. The credential information is paired with a role name corresponding to the control account. This information is used by operation 511 all organizations within the network that these accounts belong to. This operation is recursively performed until all children organizations are discovered (i.e., O1, O2 . . . Om). At operation 512 the associated accounts with the identified organizations are retrieved. In one embodiment, for each organized identified, a matching account ID from the control account IDs is generated with the control credentials. At operation 513, a role resource identifier 514, such the Amazon Resource Naming (ARN), for the linked accounts are created within the identified organization. In one embodiment, the role identifier 514 is created utilizing the account ID and the paired role name. This information is stored in cache 503 and the workloads associated with the identified linked accounts are discovered and stored. At operation 515, a computation of any undiscovered linked accounts is generated.

At the next collection, the time remaining for the expiration of the temporary credential (T) is compared with the threshold value (Tv). If T<Tv, operations 511-514 are performed again. If, on the other hand, T>=Tv, additional workload associated with the linked accounts in operations 517. And at operations 518 all linked accounts are retrieved using the master account. Any linked accost for which workloads were discovered are deleted and the associated control account is also deleted. And operations of the resources/services associated with retrieved temporary credential is used.

In one embodiment, O (m2=n)→where n is the number of linked accounts and m is the number of OUs created, Where m<<n, this order will approach O(n).

Figure 6:
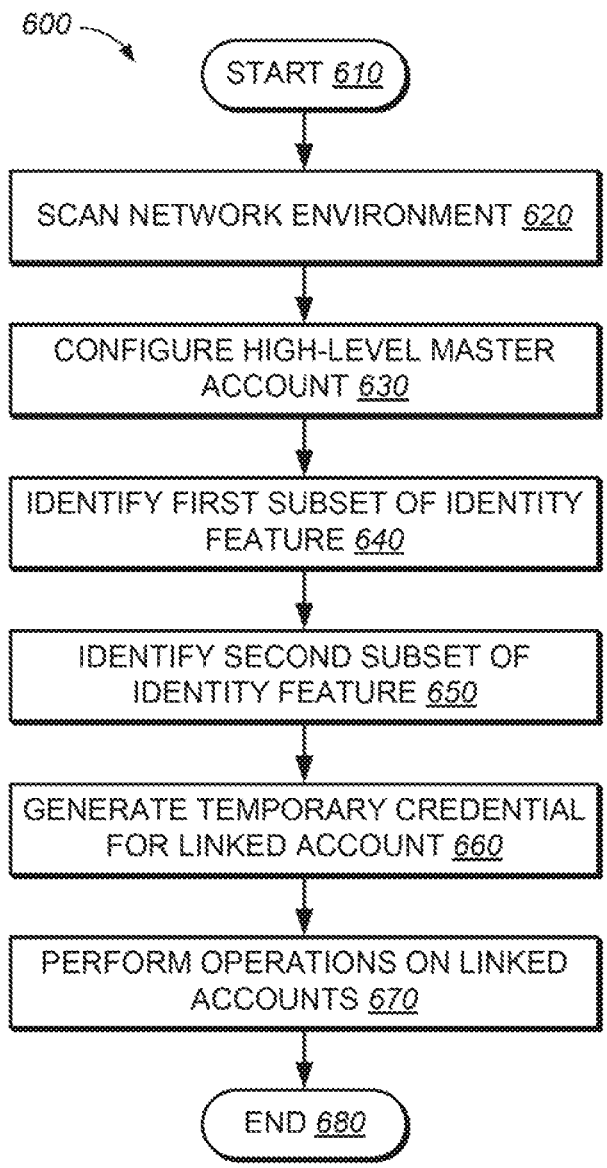
FIG. 6 is a flow chart of an exemplary account configuration and discovery, in accordance with are embodiment of the present invention.

Referring now to FIG. 6, a flow diagram 600 of an embodiment of the process flow of the present invention Is provided. As will be discussed below, it should be noted that in various embodiments, novel aspects of the present account discovery system may be integrated into a complete access system. In various other embodiments, novel aspects of the present account discovery system may exist as a separate component or module. In one such embodiment, the separate component or module will operate, for example, as a server, which runs independently from the main component of, for example, a legacy or conventional account retrieval system.

Referring still to FIG. 6, flow diagram 600 shows how accounts are hierarchically created and discovered in accordance to one embodiment of the present invention is shown. The feature 600 includes the steps of scanning the network environment 620, performing a high level configuration of a master account 630, a step 640 of identifying a first subset of control accounts a second step 650 of identifying a second subset of linked accounts and a step 660 of generating a hierarchical account structure in the computing environment. In this manner the system 299 can generate a hierarchy account structure and automatically discover accounts corresponding application/service continuously or periodically by request.

After starting at step 610, method 600 can proceed to step 620. In step 620, the system can actively scan the network environment to identify applications; services with the related user accounts to these applications/services. In embodiment of the present invention, the scanning of the network environment may be performed periodically by schedule. In another embodiment, the scanning of the network environment may be performed by request. After step 620 the auto-discovery component 299 automatically configures a master account 650 corresponding to the applications/services with the corresponding accounts scanned from the network environment. In one embodiment, the master account serves as the root account for an organization from which other accounts in that particular account will emanate. At Step 640, the account discovery component 299 identifies control accounts related to the scanned applications and service. In one embodiment, the control accounts are recursively retrieved. The control accounts are temporarily credentialed to allow the account discovery component 299 retrieve accounts linked to the control account at Step 650. Further at Step 650, if the linked accounts discovered have associating workload, the links are removed with the associated control accounts from the discovery list. If, on the other hand, the link accounts discovered do not have associated workloads, the link accounts with the associated control accounts are kept and at Step 660, a hierarchy database of all the keep control and link accounts are stored associated to the configured master account. At step 670, the auto-discovery component 299 performs operations on the linked accounts.

As described above method 600 can be recursive. Therefore component 299 can continuously search for and discover accounts spanning the network environment to determine permissible credentialed accounts to applications/services to authenticated organizations.

Hence, embodiments of the present invention greatly extend beyond conventional methods for providing account information to machines or components of a computing environment. Moreover, embodiments of the present invention amount to significantly more than merely using a computer to provide conventional account retrieval measures to machines or components of a computing environment. Instead, embodiments of the present invention specifically recite a novel process, necessarily rooted in computer technology, for providing automatic discovery of accounts credentialed to machines or components of a computing environment.

Additionally, embodiments of the present invention provide a security system including a novel search feature for machines or components (including, but not limited to, virtual machines) of the computing environment. The novel search feature of the present security system enables ends users to readily assign the proper and scopes and services the machines or components of the computing environment. Moreover, the novel search feature of the present security system enables end users to identify various machines or components (including, but not limited to, virtual machines) similar to given and/or previously identified machines or components (including, but not limited to, virtual machines) when such machines or component satisfy a particular given criteria. Hence, in embodiments of the present security system, the novel search feature functions by finding or identifying the "siblings" of various other machines or components (including, but not limited to, virtual machines) within the computing environment.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for automated analysis of features in a computing environment, said method comprising:

automatically monitoring components of said computing environment;

scanning said computing environment to define groups of said components;

determining access authorizations to said groups of said components;

performing a feature selection analysis of said groups of said components according to said access authorizations of said computing environment;

provided said feature selection analysis determines that said access authorizations are hierarchically defined to enable access to said components; and providing results of said method for automated analysis of said features of said components of said computing environment.

2. The computer-implemented method of claim 1, further comprises:

performing a hierarchical classification of said access authorizations.

3. The computer-implemented method of claim 2, wherein said performing a hierarchical classification of said access authorization, comprises:

a first level master classification of said access authorizations, wherein said first level master classification has access authorization to said group of components to discover all access authorizations to said group of components.

4. The computer-implemented method of claim 3, wherein said performing a hierarchical classification of said access authorizations selection further comprises:

a mid-level control classification of said access authorizations.

5. The computer-implemented method of claim 4, wherein said performing a hierarchical classification of said access authorizations further comprises:

a lower level linking classification of said access authorizations.

6. The computer-implemented method of claim 5, wherein said mid-level control classification assumes control over said low level linking classification of said access authorizations of said components in said components in said computing environment.

7. The computer-implemented method of claim 6, wherein said performing a hierarchical classification of said access authorizations further comprises assigning a security trust credential to said mid-level control classifications.

8. The computer-implemented method of claim 7, wherein said assigning a security trust credential to said mid-level control classification further comprises combining application programming interfaces in said computing environment with said group components.

9. The computer-implemented method of claim 8, wherein said providing results of said method for said automated analysis of said features of said components of said computing environment further comprises:

providing said results to an automated accounts discovery system.

10. The computer-implemented method of claim 1, further comprising:

periodically repeating said automated analysis of said features in said computing environment to generate updated results of said automated analysis of said features of said components of said computing environment.

11. The computer-implemented method of claim 10, further comprising:

providing said updated results of said automated analysis of said features of said components of said computing environment to said accounts discovery system.

12. The computer-implemented method of claim 1, further comprising:

automatically providing said results for said automated analysis of said features of said components of said computing environment without requiring intervention by a system administrator.

\* \* \* \* \*